(12) United States Patent
Gairuboina et al.

(10) Patent No.: US 11,956,506 B2
(45) Date of Patent: Apr. 9, 2024

(54) METHOD AND SYSTEM FOR USER-ORIENTED STREAMING OF CONTENT

(71) Applicant: SAMSUNG ELECTRONICS CO., LTD., Suwon-si (KR)

(72) Inventors: Sai Krishna Gairuboina, Bangalore (IN); Prasenjit Chakraborty, Bangalore (IN); Luckraj Shrawan Kumar, Bangalore (IN); Karan Rakesh, Bangalore (IN); Rishabh Mittar, Bangalore (IN); Jongkyu Kim, Suwon-si (KR); Rajaram Hanumantacharya Naganur, Bangalore (IN); Rajiv Chintala, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 17/429,768

(22) PCT Filed: Feb. 24, 2020

(86) PCT No.: PCT/KR2020/002602
§ 371 (c)(1),
(2) Date: Aug. 10, 2021

(87) PCT Pub. No.: WO2020/175866
PCT Pub. Date: Sep. 3, 2020

(65) Prior Publication Data
US 2022/0191592 A1    Jun. 16, 2022

(30) Foreign Application Priority Data

Feb. 25, 2019 (IN) .............................. 201941007335
Sep. 9, 2019 (IN) .............................. 201941007335

(51) Int. Cl.
*H04N 21/442* (2011.01)
*G06N 3/006* (2023.01)
(Continued)

(52) U.S. Cl.
CPC ..... *H04N 21/466* (2013.01); *H04N 21/26258* (2013.01); *H04N 21/44209* (2013.01);
(Continued)

(58) Field of Classification Search
CPC ....................... H04N 21/44209; H04N 21/466
See application file for complete search history.

(56) References Cited

U.S. PATENT DOCUMENTS 8,843,427 B1 * 9/2014 Lin ........................ G06N 20/00
705/16
9,124,642 B2 * 9/2015 Choudhury ......... H04L 65/1059
(Continued)

FOREIGN PATENT DOCUMENTS

CN    108063961    5/2018
CN    108391143    8/2018
(Continued)

OTHER PUBLICATIONS

Partial Supplementary Search Report dated Jun. 22, 2022 in counterpart European Patent Application No. 20763694.5.
(Continued)

*Primary Examiner* — Hsiungfei Peng
(74) *Attorney, Agent, or Firm* — Nixon & Vanderhye P.C.

(57) ABSTRACT

The disclosure relates to a method and system of selectively deploying an application for facilitating quality-of-experience (QoE) in terms of streaming multimedia content in a networking environment comprising a user-equipment (UE) and a networking node provided with a predictive analysis module. The method comprises: capturing parameters pertaining to UE from at least one of a version of the predictive
(Continued)

analysis module with respect to the UE, a current processor occupancy within the UE, a power-level within the UE, network conditions pertaining to the access network etc. One or more of the captured parameters and the observed network conditions is analyzed. Based on analysis, inference is drawn for selecting between the predictive analysis model of the UE and of the networking node for thereby enabling a customized streaming of multimedia content at the UE.

10 Claims, 10 Drawing Sheets

(51) Int. Cl.
| | |
|---|---|
| *G06N 3/08* | (2023.01) |
| *H04L 65/612* | (2022.01) |
| *H04L 65/75* | (2022.01) |
| *H04L 65/80* | (2022.01) |
| *H04N 21/262* | (2011.01) |
| *H04N 21/45* | (2011.01) |
| *H04N 21/466* | (2011.01) |
| *H04N 21/647* | (2011.01) |
| *H04N 21/658* | (2011.01) |
| *H04N 21/845* | (2011.01) |

(52) U.S. Cl.
CPC ... *H04N 21/4532* (2013.01); *H04N 21/64738* (2013.01); *H04N 21/8456* (2013.01)

(56) References Cited

U.S. PATENT DOCUMENTS

| | | |
|---|---|---|
| 10,178,399 B2 | 1/2019 | Orton-Jay et al. |
| 2011/0093605 A1 | 4/2011 | Choudhury et al. |
| 2016/0337680 A1 | 11/2016 | Kalagi et al. |
| 2017/0026713 A1 | 1/2017 | Yin et al. |
| 2017/0347159 A1* | 11/2017 | Baik ................ G06N 5/01 |
| 2018/0191587 A1 | 7/2018 | Chen et al. |
| 2019/0037270 A1 | 1/2019 | Arpirez Vega et al. |
| 2019/0102695 A1 | 4/2019 | Biswas et al. |

FOREIGN PATENT DOCUMENTS

| | | |
|---|---|---|
| EP | 2 916 555 | 9/2015 |
| KR | 10-2017-0100079 A | 9/2017 |
| KR | 10-1795537 | 12/2017 |
| WO | 2014/190308 | 11/2014 |

OTHER PUBLICATIONS

Poliakov, Vitalii et al: "Case for Caching and Model Predictive Control Quality Decision Algorithm for HTTP Adaptive Streaming: Is Cache-Awareness Actually Needed?", 2016 IEEE Globecom Workshops (GC Wkshps), Dec. 4, 2016, pp. 1-6, XP033063040, DOI: 10.1109/GLOCOMW.2016.7848854 [retrieved on Feb. 8, 2017].
Extended European Search Report dated Oct. 13, 2022 in corresponding EP Patent Application No. 20763694.5.
Chinese Office Action dated Dec. 1, 2022 in corresponding CN Patent Application No. 202080016187.8.
Sun et al., "CS2P", ACM SIGCOMM 2016 Conference, ACM, dated Aug. 22, 2016, pp. 272-285.
International Search Report for PCT/KR2020/002602 dated Jul. 17, 2020, 4 pages.
Written Opinion of the ISA for PCT/KR2020/002602 dated Jul. 17, 2020, 6 pages.
Korean Office Action dated Apr. 3, 2023 for KR Application No. 10-2021-7027176.
Chinese Office Action dated Jun. 30, 2023 for CN Application No. 202080016187.8.
IN Notice of Hearing dated Nov. 8, 2023 for IN Application No. 201941007335.
Chinese Office Action dated Nov. 24, 2023 for CN Application No. 202080016187.8.

* cited by examiner

METHOD AND SYSTEM FOR USER-ORIENTED STREAMING OF CONTENT

CROSS-REFERENCE TO RELATED APPLICATIONS

This application is a national stage of International Application No. PCT/KR2020/002602 designating the United States, filed on Feb. 24, 2020, in the Korean Intellectual Property Receiving Office and claiming priority to Indian Provisional Patent Application No. 201941007335, filed Feb. 25, 2019, in the Indian Patent Office, and Indian Non-Provisional Patent Application No. 201941007335, filed Sep. 9, 2019 in the Indian Patent Office, the disclosures of which are incorporated by reference herein in their entireties.

BACKGROUND

Technical Field

The disclosure relates to computing device based communication-systems, for example, to multimedia data based streaming mechanisms.

Background Art

As it is known as a part of streaming of multimedia-data through adaptive bit rate streaming (ABR), a content provider provides a single video in different resolutions/quality. Each video is further divided into small chunks of uniform duration (e.g., 5 seconds) and stored at server of the content provider. A video-player at the client side evaluates the available network bandwidth on the device, downloads suitable video quality and renders the video.

Current state of the art adaptive commercial streaming algorithms are rule-based and at least fail to provide optimal video-quality e.g. maximizing and/or improving video quality while minimizing and/or reducing re-buffering and better video playback smoothness in all network conditions. In an example, the underlying algorithms at least do not provide user oriented video streaming experience. Moreover, the conventional approaches are known to use a server for prediction, which may add to latency and, under low network conditions, the video streaming condition often further deteriorates.

In an example, an office goer daily commutes to his office. If he travels through a region of no/low network conditions (a tunnel, a hill or a poorly connected area), it is known that a standard rule based ABR algorithm will not be able to account for such a drastic drop in network conditions and will result in buffering until it re-enters a region of stable network. Now at this stage, even a machine learning (ML) trained model may not be able to account for such unforeseen circumstances since the same at best is expected to take an ideal general decision, taking into account the present input parameters.

A prior art publication discloses an adaptive-code rate video transmission based on reinforced learning. While the same appropriates ML based models for execution, the method requires a large number of data sets to show significant performance in all network conditions. The network conditions across the globe tend to vary a lot and it may not be feasible to collect data from all parts of the globe. The prior art falls short of considering the variety of input space and fails to adduce a personalization experience for the user.

Yet another prior art publication discusses modification of manifest of the media content to serve the users with a better streaming experience. However, the prior art relies heavily on the server hosting the content to contain the logic and accordingly may only be deployed on the server side.

Accordingly, there remains a long pending need to achieve high video streaming performance using less training data and training time.

Moreover, there is also a need for achieving a need of enabling execution of a customized multimedia data streaming at the client device without compromising the quality of experience (QoE).

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter.

Embodiments of the disclosure relate to a method of selectively deploying an application for facilitating quality-of-experience (QoE) in terms of streaming multimedia-content in a networking environment comprising a user-equipment (UE) and a networking-node provided with a predictive-analysis module. An example method comprises: capturing parameters pertaining to UE from amongst at least one of a version of the predictive-analysis module with respect to the UE, a current processor occupancy within the UE, a power-level within the UE, network conditions pertaining to the access-network etc. Thereafter, one or more of the captured-parameters and the observed network conditions is analyzed. Based on analysis, an inference is drawn for selecting between the UE and networking node for selecting the predictive analysis model and thereby enabling a customized streaming of multimedia content at the UE.

In an example embodiment, a method in a networking environment to generate a user-specific data-streaming mechanism for a user-equipment (UE) comprises: simulating content playback based on synthetic network traces and at least one standard adaptive bitrate (ABR) logic; logging a plurality of input and output states associated with said simulated content playback to create a log of labelled data; generating at least a first type of model based on training through a first machine learning (ML) based criteria using said log of labelled data; re-simulating content playback at least based on real network traces and one or more bit-rate selected based on the first model; and generating a second model by training the first model through a reinforcement ML criteria based on analysis of results of the re-simulating of the content playback in view of the real network traces.

Embodiments of the disclosure provide a technique to generate customized ABR application using a combination of supervised learning and reinforcement learning to achieve high video streaming performance using less training data and training time. Such a trained model may be deployed either on a device, server, mobile edge computing (MEC) based server or any combinations thereof. The media player on the user device provides a substantially seamless and uninterrupted video-streaming experience.

Moreover, a selection of appropriate model from the hybrid deployment of the customized ABR application using smart strategy ensures optimal usage of resources, stability and improved accuracy. Further, the on-device model may learn the user network pattern over the time and provide a user-oriented video streaming experience. Moreover, the training and deployment on MEC using local user traffic, user data and network conditions greatly improves prediction accuracy The above and other aspects, features and advantages of certain example embodiments will be described in greater detail below with reference to various example embodiments thereof, which are illustrated in the appended drawings. It is appreciated that the disclosure and drawings describe various example embodiments of the disclosure and are therefore not to be considered limiting of its scope. The disclosure will be described and explained with additional specificity and detail with the accompanying drawings.

Embodiments of the disclosure provide a system and a method thereof in accordance with various example embodiments, it is possible to selectively deploy an application for facilitating quality-of-experience (QoE) in terms of streaming multimedia content in a networking environment comprising a user-equipment (UE) and a networking node provided with a predictive analysis module. According to various example embodiments of the disclosure, the system and the method thereof may provide optimal video quality to the users. For example, it is possible to provide achieve video quality smoothness and maximize/improve video quality while minimizing/reducing re-buffering in varying network conditions. Furthermore, it is possible to provide a personalized video streaming experience to users.

BRIEF DESCRIPTION OF DRAWINGS

The above and other aspects, features and advantages of certain embodiments of the present disclosure will be more apparent from the following detailed description, taken in conjunction with the accompanying drawings, in which.

Figure 1:
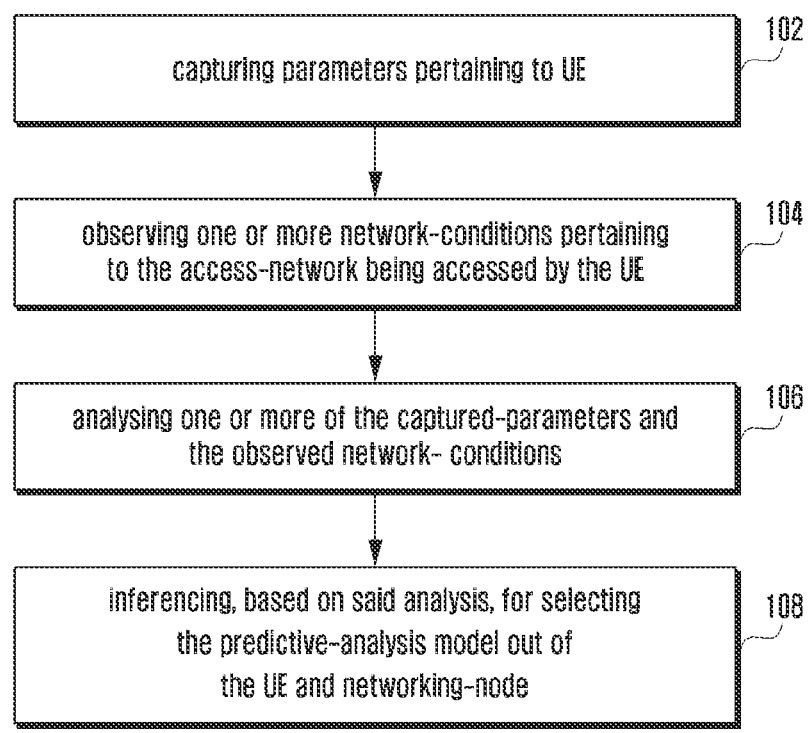
FIG. 1 is a flowchart illustrating an example method according to various embodiments.

Further, skilled artisans will appreciate that elements in the drawings are illustrated for simplicity and may not have been necessarily been drawn to scale. For example, the flowcharts illustrate example methods in terms of operations involved to aid in understanding of various example aspects of the present disclosure. Furthermore, in terms of the construction of the device, one or more components of the device may have been represented in the drawings by conventional symbols, and the drawings may illustrate details pertinent to aid in understanding the various example embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to various example embodiments illustrated in the drawings. It will be understood that no limitation of the scope of the present disclosure is intended, and as such, alterations and further modifications in the illustrated system, and such further applications of the principles of the present disclosure as illustrated therein being contemplated as would normally occur to one skilled in the art to which the present disclosure relates are included in the scope of the disclosure.

It will be understood by those skilled in the art that the foregoing general description and the following detailed description are intended to be illustrative of the present disclosure and are not intended to be limiting.

Reference throughout this disclosure to "an aspect", "another aspect" or similar language may refer, for example, to a particular feature, structure, or characteristic described in connection with an embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in greater detail with reference to the accompanying drawings.

FIG. 1 is a flowchart illustrating an example method of selectively deploying an application for facilitating quality-of-experience (QoE) in terms of streaming multimedia content in a networking environment comprising a user-equipment (UE) and a networking-node provided with a predictive analysis module according to various embodiments. The method comprises capturing parameters 102 pertaining to UE from amongst, for example, at least one of a version of the predictive analysis module with respect to the UE, a current processor occupancy within the UE, a power level within the UE. The capturing of said parameters pertaining to the device may further include capturing a current media buffer level of the UE.

Further, in operation 104, one or more network conditions pertaining to the access network being accessed by the UE are observed. Such observance of conditions pertaining to the access network may include, for example, extracting one or more of: data segment download time, a roundtrip time between the UE and a server; and historical throughput with respect to the access network.

Further, in operation 106, one or more of the captured parameters and the observed network conditions are analyzed. In operation 108, based on the analysis, an inference for selecting between the predictive analysis model of the UE and the predictive analysis model of the networking node and thereby enabling a customized streaming of multimedia content at the UE are performed. In an example, the inferencing for selecting the predictive analysis model may include selection between a machine-learning (ML) based trained model either at the UE or the networking node for execution. Such an ML based trained model may, for example, be obtained by customization of an available adaptive bit-rate technique algorithm through execution of a plurality of types of ML mechanisms. Such customization will be described in greater detail below with reference to FIG. 3.

Figure 2:
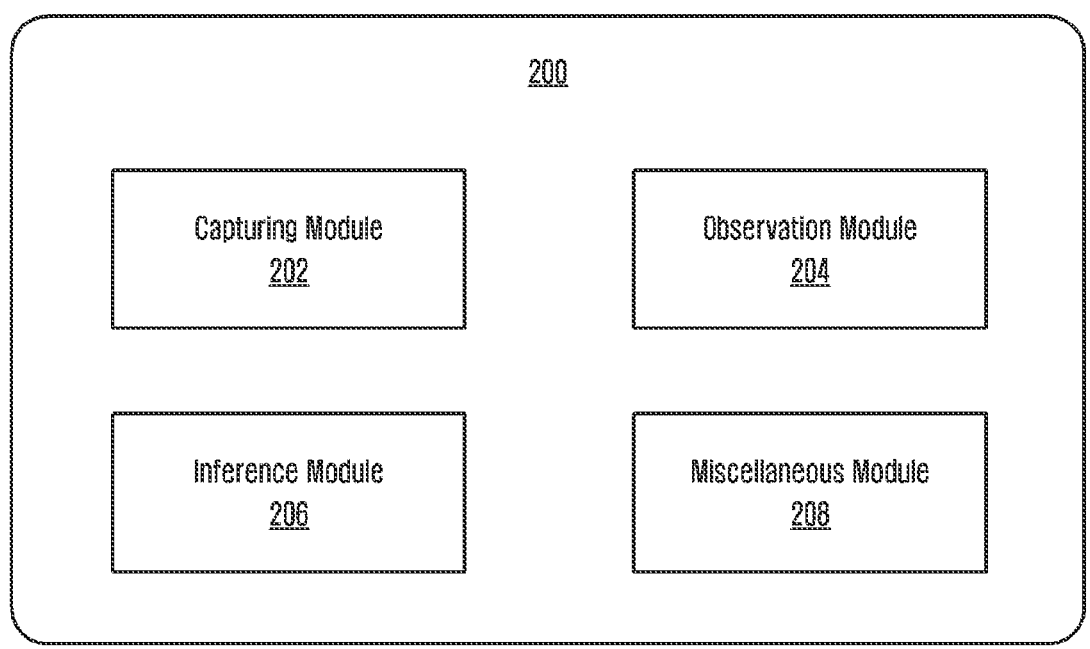
FIG. 2 is a block diagram illustrating an example system according to various embodiments.

FIG. 2 is a block diagram illustrating an example configuration of a system 200 according to various embodiments.

The system 200 includes a capturing module 202 that that may perform operation 102, an observation module 204 that may perform operartion 104, and an inference module 206 that may perform operations 106, 108. Likewise, there may be a miscellaneous module 208 within the system 200 that may facilitate operational interconnection among the modules 202, 204 and 206 and perform other ancillary functions.

Figure 3:
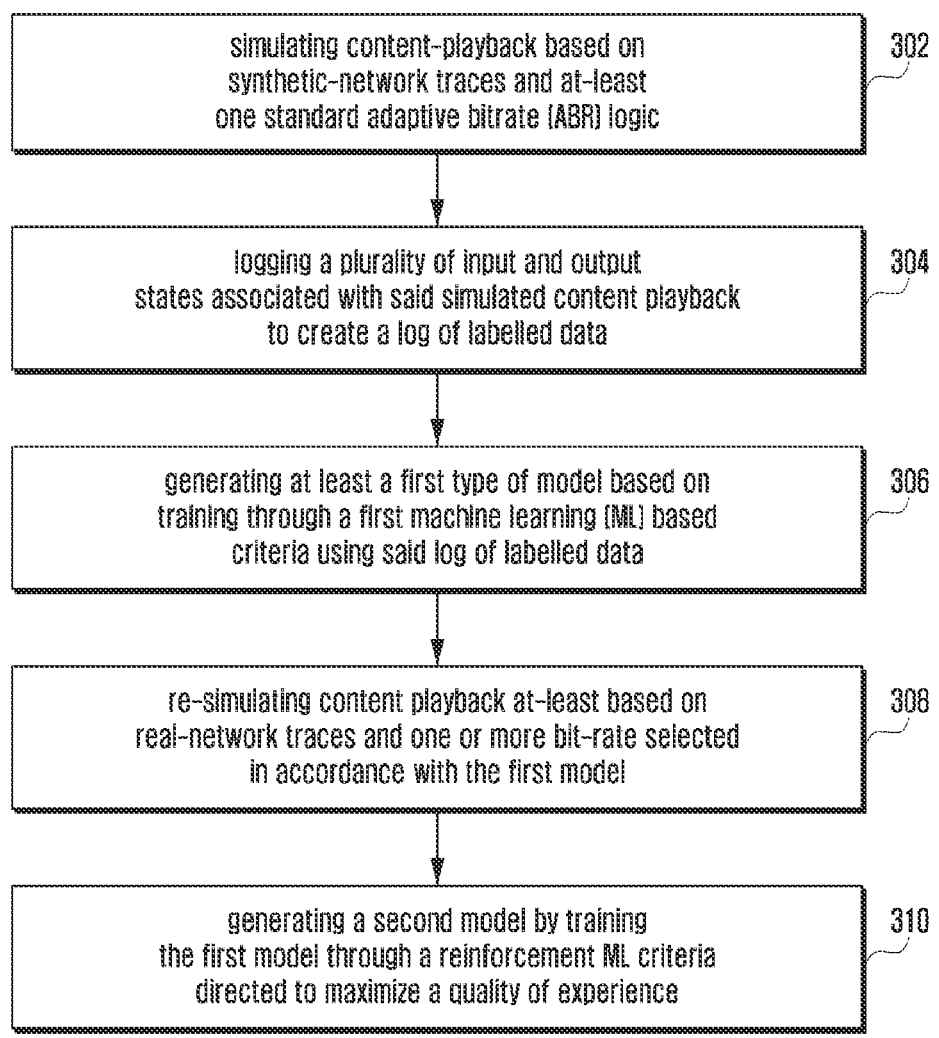
FIG. 3 is a flowchart illustrating an example method according to various embodiments.

FIG. 3 is a flowchart illustrating an example method in a networking environment to generate a user-specific data streaming mechanism for a user-equipment (UE) according to various embodiments.

In operation 302 content playback based on synthetic network traces and at least one standard adaptive bitrate (ABR) logic may be simulated. The synthetic network traces may refer, for example, to a set of synthetic data corresponding to a range of available bandwidth. In an example, the synthetic network traces may be generated using a state of the art method to simulate real network traces.

In operation 304 a plurality of input and output states associated with said simulated content playback may be logged to create a log of labelled data. Based upon the labelled data, at least a first type of model is generated in operation 306 based on training through a first machine learning (ML) based criteria using said log of labelled data. Such generation of the first model may correspond, for example, to the generation of a supervised learning (SL) based model and may be realized based on a supervised ML criteria acting as the first ML criteria.

The application of the supervised ML may be triggered by defining input state in respect of the content playback simulation performed on synthetic network simulation. The input state may refer, for example, to as at least one of a buffer-level, throughput, bitrate and average chunk size parameters. Based on the playback simulation, an output state is obtained at least as an output bitrate. The log of labelled data may be obtained as mapping between input and output states. Such labelled data enabling creation of first model based on supervised learning subjected to the first model. In an example, prior to such training of first model, the method may include capturing various parameters associated with UE pertaining to at least one of:
 current network traffic;
 allocated bandwidth to the UE;
 signal strength;
 segment download time;
 media buffer level;
 throughput history;
 battery status;
 CPU load; and
 memory status.

The training of the first model is scheduled either at the UE or a networking node (e.g., server, multi-access edge (MEC) server, etc.) based on the capturing of parameters, which leads to operation 306 of the second model. Further, in operation 308 content playback at least based on real network traces and one or more bit-rate selected in accordance with the first model may be re-simulated. The real network traces may refer, for example, to a training data captured as one or more of:
 a media size received per chunk
 time taken to download the chunk of media;
 type of network used during media playback;
 network operator used;
 duration of a media segment;
 start time of the media content playback;
 end time of the media content playback;
 longitude and Latitude Information; and
 chipset-information.

In operation 310 a second model may be generated by training the first model through a reinforcement ML criteria directed to maximize and/or improve a quality of experience. Such training may be based on analysis of results of the re-simulation of the content-playback. Such generation of the second model may be based on the execution of the reinforcement ML and may include analyzing the content playback simulation based on the real network traces, and applying post-processing and QoE improvement in respect of the simulation based on at least one of:
 playback failure type;
 start-up time;
 re-buffering duration;
 re-buffering state; and
 video quality and bitrate.

Figure 4:
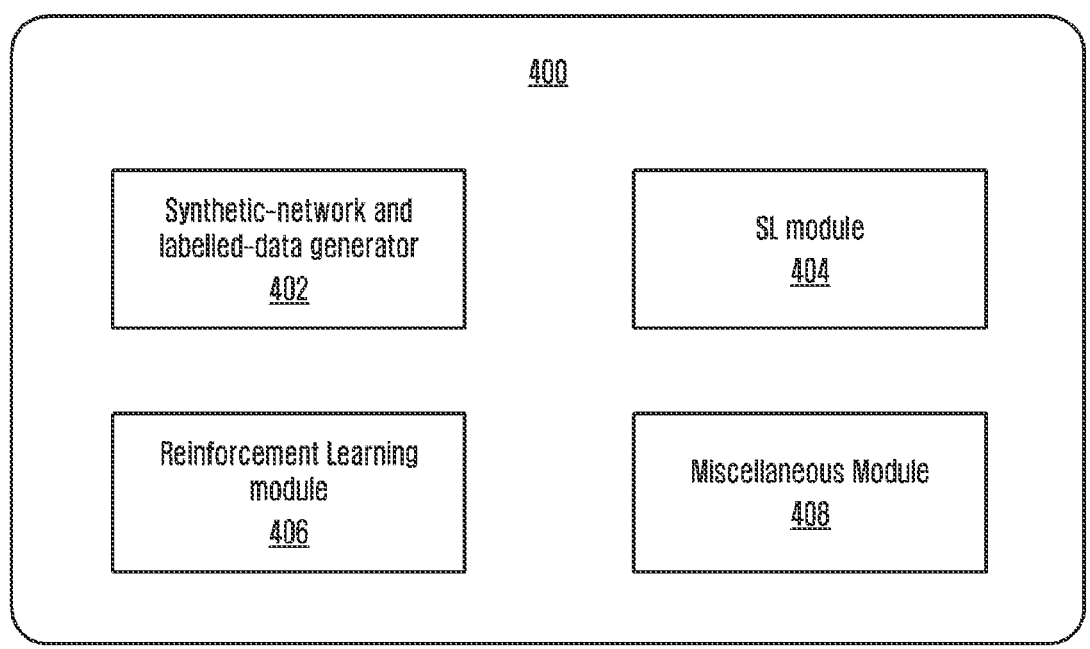
FIG. 4 is a block diagram illustrating an example system according to various embodiments.

FIG. 4 is a block diagram illustrating an example configuration of a system 400 for a telecommunication device according to various embodiments.

The system 400 includes a synthetic network traces and labelled data generator 402 that may perform operations 302 and 304, a SL module 404 (e.g., SL based machine learning module) that may perform operation 306, a reinforcement learning module 406 that may perform operations 308 and 310. Likewise, there may be a miscellaneous module 408 within the system 400 that facilitate operational interconnection among modules 402, 404 and 406, and performs other ancillary-functions.

Figure 5:
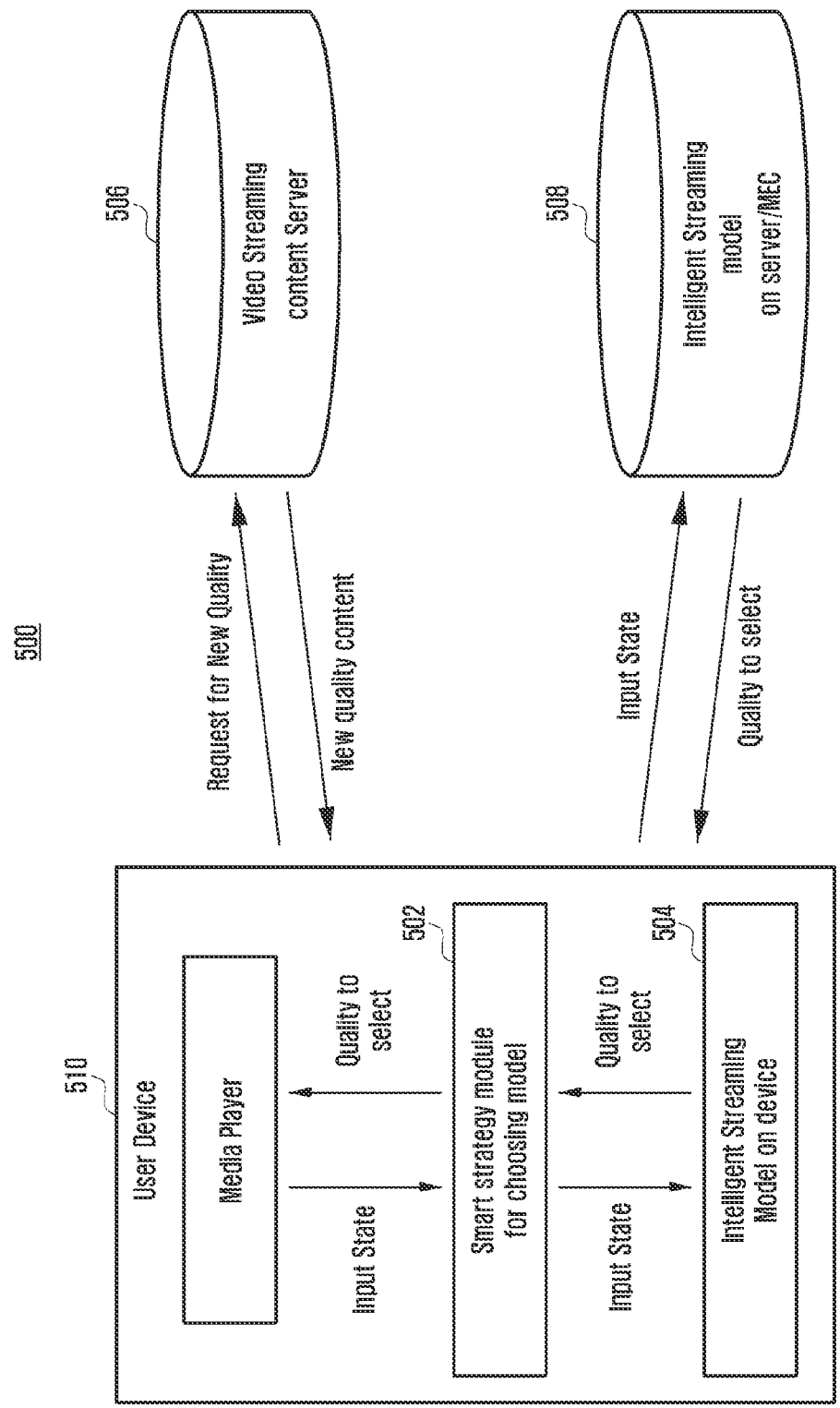
FIG. 5 is a diagram illustrating an example networking environment in accordance with the example method of FIG. 1, according to various embodiments.

FIG. 5 is a diagram illustrating an example networking environment 500 in accordance with the operations of FIG. 1 according to various embodiments.

For example, the networking environment 500 comprises a UE (or user device) 510, a video streaming content server 506 and a multi-access edge computing (MEC) server (or an edge server) 508 (also referred to as an intelligent streaming model on server/MEC). The networking environment 500 implements a method to deploy a machine-learning (ML) based trained model on the UE 510 and the MEC server 508 or a combination thereof using a Smart Strategy module 502 (corresponding to operations 102, 104, 106 and 108 of FIG. 1) that decides in runtime which model to be used for inferencing to achieve the best possible output.

In an example, as depicted with respect to FIG. 1, the smart strategy module 502 on the UE 510 collects information including, for example, and without limitation, CPU load, available-memory available, battery status etc. Accordingly, either an intelligent streaming model 504 at the device (e.g. UE 510) or an intelligent streaming model from the MEC server 508 is chosen for rendering a customized ABR based multimedia streaming to the UE 510 from the video streaming content server 506.

The "input states" as referred in FIG. 5 may correspond, for example, and without limitation, to one or more of a current media buffer level, a throughput, a prevailing-bitrate and average chunk-size of parameters to be streamed. The "quality to select" may refer, for example, to the "bit rate" as suggested by either of the intelligent-models (e.g., the intelligent streaming model 504 on the UE 510 or the intelligent streaming model on the MEC server 508) for the purposes of streaming multimedia-content. Accordingly, at least as a part of UE 510 requesting "new quality' from the video streaming content server 506, the UE 510 receives the incoming streaming from the video streaming content server 506 in accordance with the decided bit rate.

Figure 6:
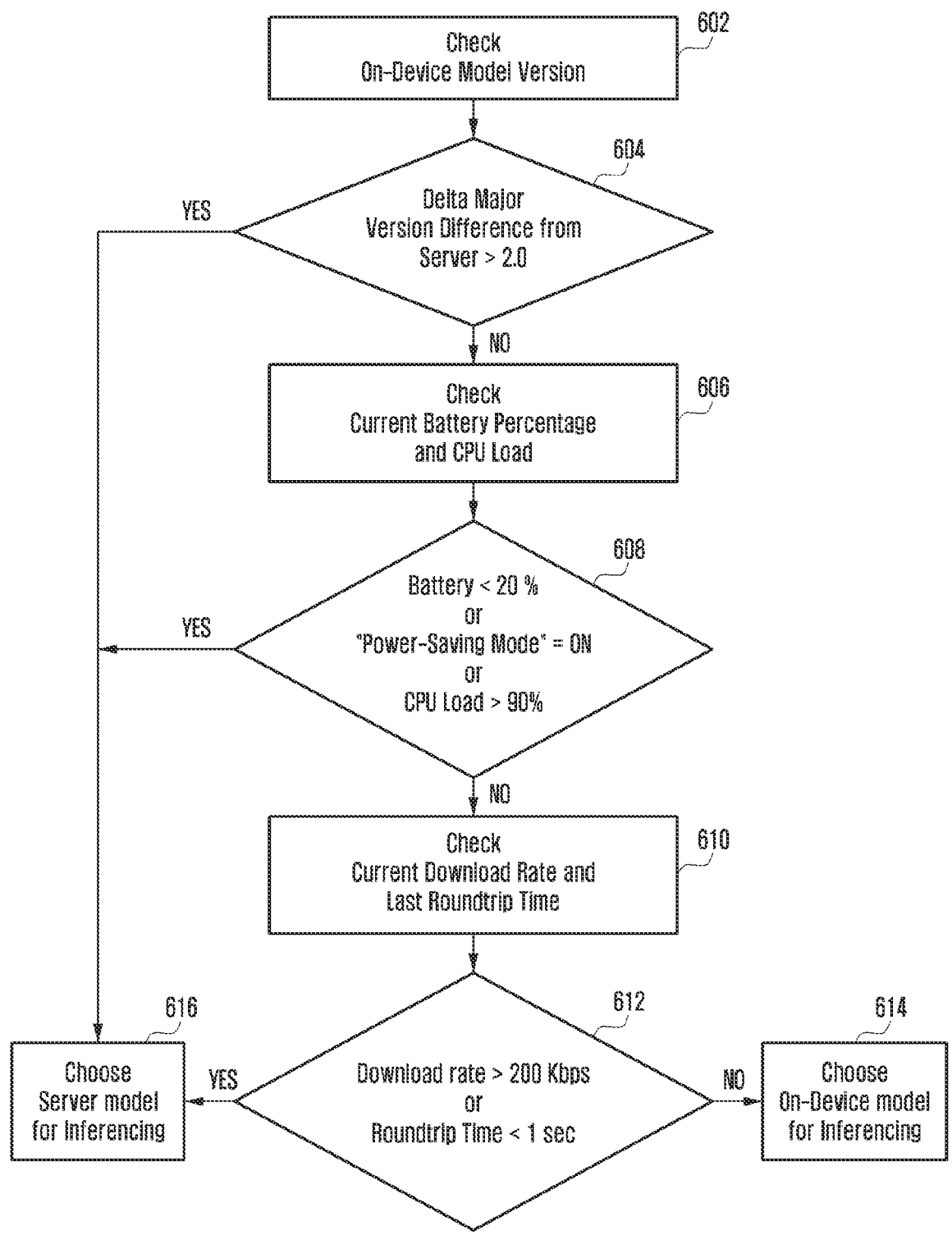
FIG. 6 is a flowchart illustrating an example method of FIG. 1, according to various embodiments.

FIG. 6 is a flowchart illustrating example operations of FIG. 1, according to various embodiments.

At operation 602, the version of the trained model as present on-Device (e.g. UE 510) is noted.

At operation 604, the version of the trained model as noted in step 602 is compared with the MEC version and the difference is determined. For example, a delta major-version difference with the Server is ascertained and it is observed if the version difference is greater than 2.0.

As a part of system-parameter determination, a current battery percentage and CPU-Load is checked at operation 606. For example, it is determined at operation 608, if Battery<about 20% or "Power-Saving Mode"=ON or CPU Load>about 90%.

As a part of network-parameter determination, a current download Rate and a last Roundtrip Time is determined at operation 610. For example, it is ascertained at operation 612 if a Download-rate is greater than about 200 Kbps or a Roundtrip Time<about 1 sec.

At least based upon the determination in operations 602, 604, 606, 608, 610 and 612, the trained model (as obtained by the combination of SL and reinforcement-learning) implemented either at the device (e.g. UE) or at the MEC server is chosen for inference.

Overall, the aforesaid decision-making as depicted in operations 602, 604, 606, 608, 610 and 612 may correspond to 'smart-strategy' decisions as occurring on device side. At least an ensuing advantage is that optimal and/or improved resource usage and improved accuracy. In an example, this may be summarized as illustrated by way of non-limiting example in Table 1 below:

TABLE 1

| System parameters | Selected intelligent model |
| --- | --- |
| Low Battery Condition | Use MEC/Server side model for inferencing |
| High CPU Load | Use MEC/Server side model for inferencing |
| Low Network Condition | Use Device side model for inferencing |
| Outdated Device side model version | Use MEC/Server side model for inferencing |

Figure 7:
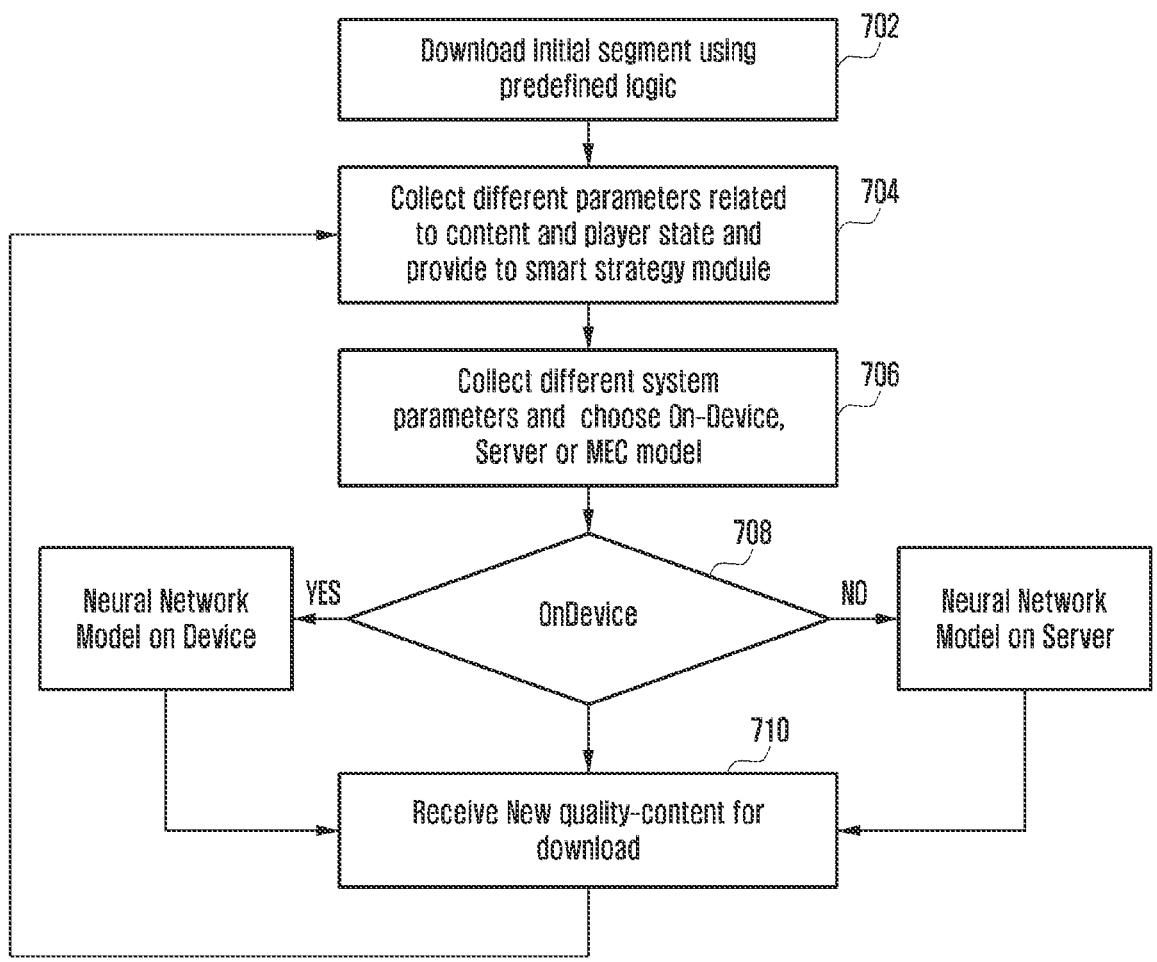
FIG. 7 is a flowchart illustrating an example method of FIG. 1, according to various embodiments.

FIG. 7 is a flowchart illustrating an example implementation of the operations illustrated in FIG. 1, according to various embodiments.

At operation 702, an initial-segment or packet data corresponding to multimedia data is downloaded as a part of commencement of multimedia data streaming-operation.

At operation 704, the different parameters related to content streaming and media-player state are captured. In an example, the parameters related to content streaming may include, without limitation, buffer, throughput, bitrate and average chunk size parameters, etc. In another example, the parameters related to media player state may include, without limitation, Media buffer level, e.g. Buffer Remaining of the Media-Content during re-downloading and buffering, and a throughput history, etc.

At operation 706, the system and network parameters may, for example, be gathered in accordance with operations depicted in FIG. 6.

At operation 708, the decision is made to employ the trained ML model of either the device or MEC (e.g., server) for achieving the user-oriented streaming experience.

At operation 710, as a result the result of the execution (e.g., a quality parameter) of the trained model, the downloading of a new quality multimedia content is achieved. In an example, the new quality multimedia-content may refer, for example, to the content downloaded with a bit rate as determined by the trained model. Further, the control is transferred back to operation 704 for future decision making in respect of bit rate.

Figure 8:
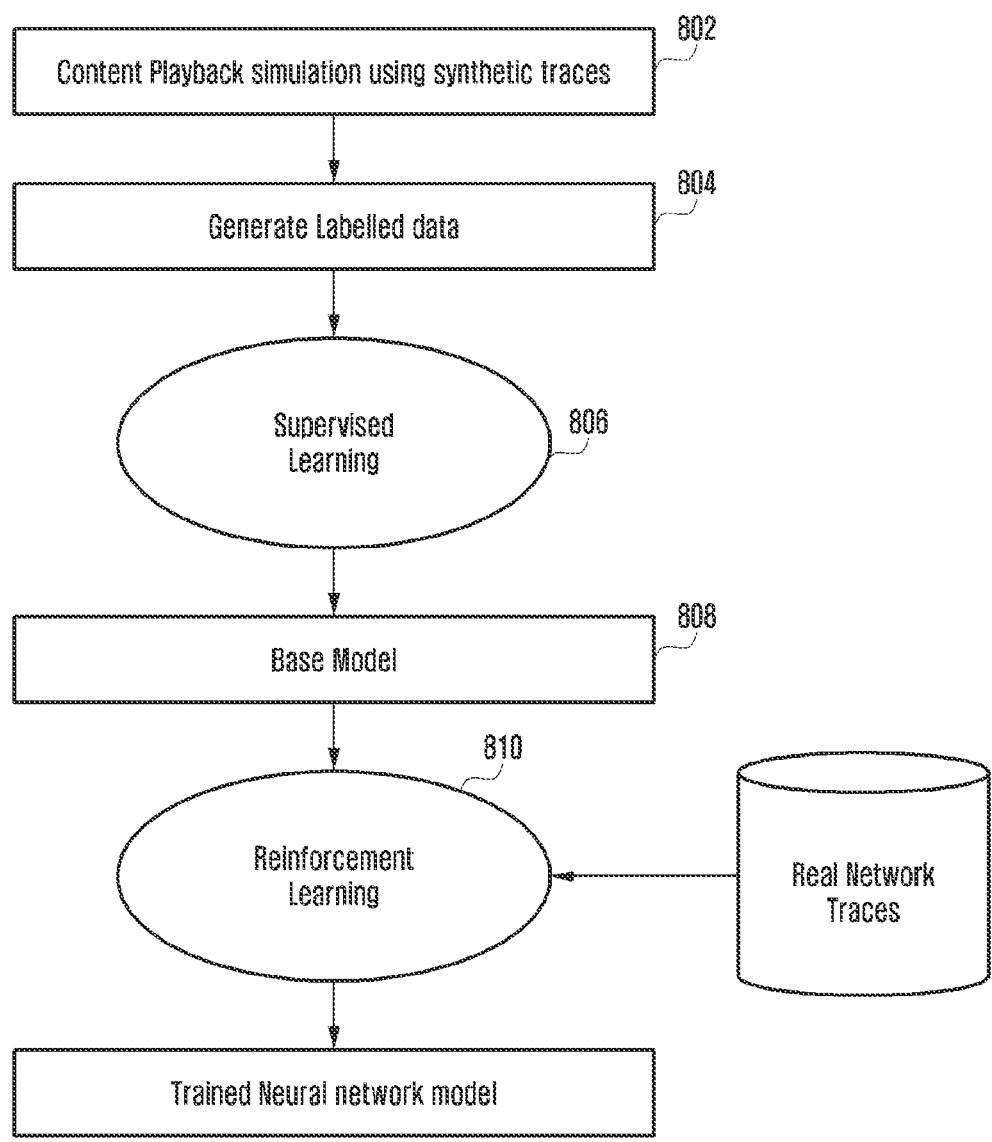
FIG. 8 is a flowchart illustrating an example method of FIG. 3, according to various embodiments.

FIG. 8 is a flowchart illustrating an example implementation of operations of FIG. 3, according to various embodiments.

At operation 802, a Content Playback simulation is achieved based on synthetic traces. The content-playback simulation corresponds to a multi video quality type (e.g., 2K, FHD, and/or HD etc.). The encoding may including, for example, and without limitation, MPEGTS, FMP4 etc. The streaming-protocol may be defined as HLS, DASH etc.

The synthetic network traces may represent simulated network conditions as required for simulating the content-playback. According to an embodiment, the disclosure may generate a high-number of state-spaces as a part of synthetic traces and accordingly allows for exploration of low probability corner cases, thereby ensuring addressing the same in a suitable manner. Based on such synthetically generated dataset, such scenarios may be simulated that may not be publicly accessible as access networks (e.g., 5G networks).

For example, as a part of present step 802, a corpus of network traces ranging from about 0 Kbps (e.g., no network conditions) with varying granularities are created. In another example, the network traces may range from about 128 Kbps to about 80 Mbps. The lower end of the scale has a very small gap between consecutive bitrates and it increases as higher bitrates are involved. The network traces may be generated using, for example, using a state of the art Markovian-model where each state represents the bandwidth at that point in time. State transition probabilities are varied to help model both stable (stationary use case) and unstable (moving use case) network conditions. In a particular state, it may be impossible to expect the same throughput across any two points in time. Accordingly, a value may be picked from a Gaussian distribution cantered on the bandwidth for the current-state. The variance falls under the 0.05 to 0.5 range.

The synthetic network traces may be generated keeping in mind the standard ABR-algorithm (e.g., Buffer based/Bandwidth based/Model Predictive Control or a combination of them) and considering possible real network BW ranges (e.g., from no network to about 1 Gbps). The synthetic network traces so generated assist the supervised learning as elaborated in forthcoming description as they help explore all the possible-states and mitigate the possibility of any unexplored-state. The same in turn mitigates the possibility of a sub-optimal performance in unexplored state spaces since there is a reliance on the generalization of the model to cover up these areas.

At operation 804, the labelled data is generated as a dataset for Supervised Learning (SL). In an example, as a part of the content-playback simulation as illustrated in operation 802, a buffer-based ABR algorithm may be employed as it provides stable performance and is relatively easy to prototype due to absence of highly complex relationships. The standard ABR is executed over the generated synthetic traces and tuples of the input states and the mapped output states are created. The input states include buffer, throughput, bitrate and average chunk size parameters. This is joined with the chosen output bitrate and logged for example n into a CSV file. This dataset is used to train a model or the base model. In an example, the model training is carried using standard supervised learning techniques such as, for example, and without limitation, RMSProp optimizers with categorical cross-entropy loss calculation, or the like. The output bitrates are converted into a one-hot encoded format to work seamlessly Operation 806 pertains to execution of supervised learning (SL) over the model (e.g., existing ABR algorithm) based on the labelled dataset. This pre-training operation helps in faster training and a better generalization without the need for huge number of real network traces at the later stage of reinforcement learning. SL pre-training is carried out by utilizing a simulated video player which is modified to accommodate the chosen ABR algorithm. Training a model using the supervised learning method with the dataset generated at least allows creation of a stable base model that can facilitate further training.

operation 808 pertains to creation of the base model that has been obtained through operation 806. The achievement of base model at least facilitates performance on the level of an existing algorithm. In the absence of this operation, the model may be exposed to the risk of failing to generalize to particular or unforeseen scenarios during reinforcement. Additionally, as the SL is significantly faster than Reinforcement Learning (RL), hence the creation of the base model is able to mitigate the unnecessary time spent exploring the various state spaces and making suboptimal decisions.

The base model created using the mentioned procedure may then be used as a starting point to execute reinforcement learning. The base model provides a platform that allows focusing upon maximizing and/or improving performance and being least affected with the overhead of exploration and generalization. This also significantly shortens the training time required to achieve a trained model through reinforced learning.

Operation 810 pertains to reinforced learning or RL phase based on real network traces. In an example, algorithms for RL may include, for example, and without limitation, Advantage Asynchronous Actor Critic (A3C), DQN, IMPALA or variations of these algorithms. The base model from operation 808 is used as the actor in this setup and the critic is trained from scratch, but with a higher learning rate. In an example, a simulated video player is used for content playback simulation based on the base model or the first model. This is so, since the base model is now itself acting as the ABR algorithm in the absence of any actual underlying ABR algorithm. This allows the base model to make the bitrate decisions and the player simulates the results considering the real network conditions and a selected bitrate at any given instant. At least this reduces the time required to complete a video from the order of minutes to milliseconds. Multiple actor critic agents are used, each of which receives random traces to run the video on. This also helps speed up the time required to obtain a finished model.

In addition, since reinforcement learning problems have a goal towards which it converges, the goal in the present scenario is to maximize and/or improve the Quality of Experience (QoE) achieved by the model for the video played. Accordingly, in an implementation as a part of reinforcement learning, post-processing and QoE improvement in respect of the simulation is achieved through capturing of said parameters as illustrated below by way of non-limiting example in Table 2:

TABLE 2

| Type of parameter | Description |
| --- | --- |
| Playback failure type | Type of Error during media playback (e.g., Server not responding, No Network etc.) |
| Start up Time | Time required to start the playback (from User pressing Play button to Actual Start) |
| Re-buffering duration | Time required to re-buffer content in between playback with Buffering Icon |
| Re-buffering state | If Re-buffering state when Playback Ended (To know if Re-buffering caused User to Stop Playback) |
| Video Quality and Bitrate | Video Content quality in terms of Bitrate (in bps) from Media Playlist File |

Figure 9:
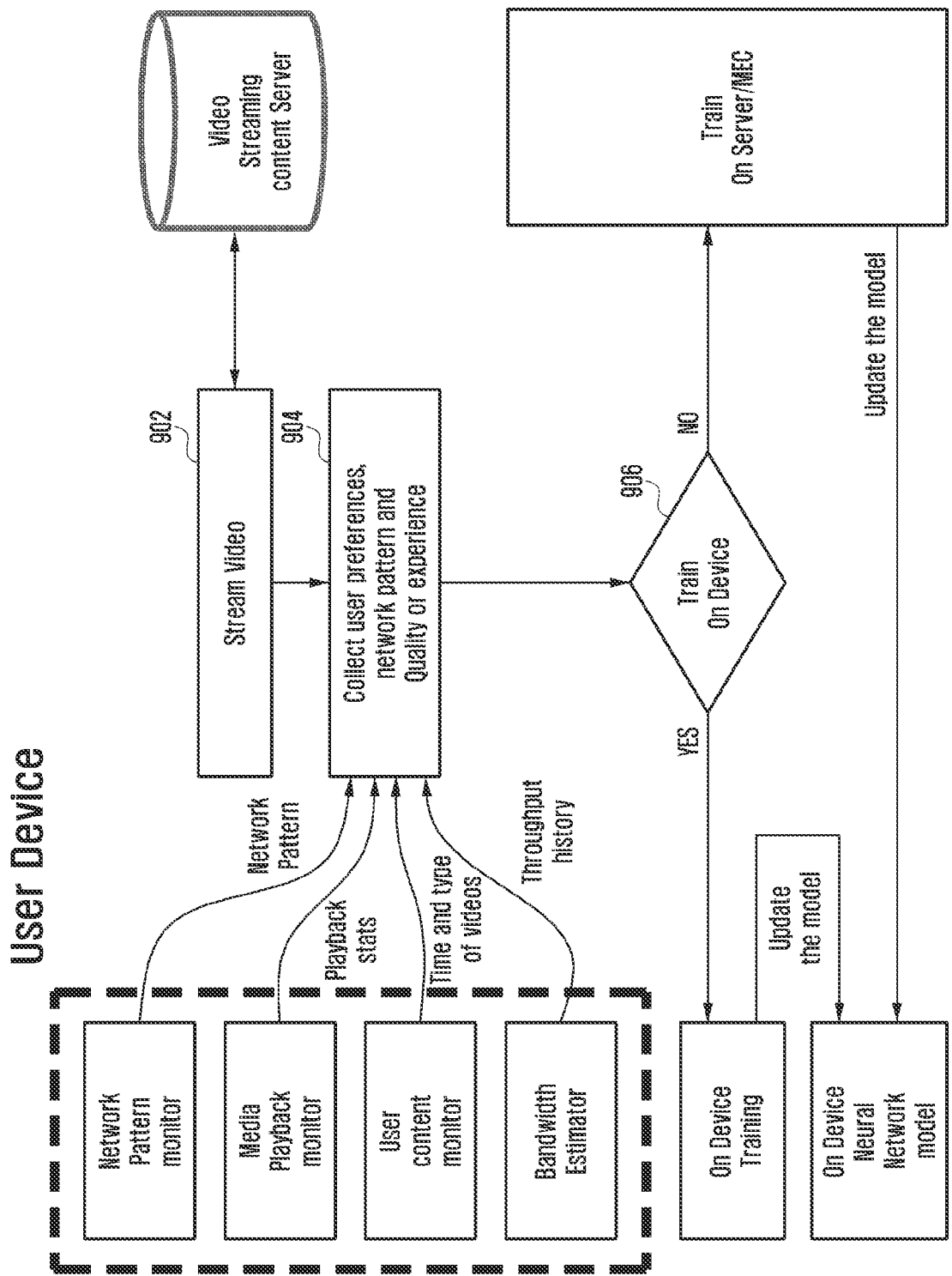
FIG. 9 is a diagram illustrating an example method of FIG. 3, according to various embodiments.

FIG. 9 is a diagram illustrating an example implementation of operations of FIG. 3, according to various embodiments.

Operation 902 may refer, for example, to streaming of multimedia content from a content hosting server (e.g., video content streaming server) by a UE.

Operation 904 may refer, for example, to capturing of parameters associated with UE pertaining to at least one of:
  current network traffic or network pattern;
  allocated bandwidth to the UE;
  a through history provided by a bandwidth estimator
  a prevailing signal strength;
  segment download time as a part of network parameter;
  media buffer level as a part of media player statistics;
  a throughput history with respect to the present access network; and
  type of content being streamed as a part of user-preferences.

At operation 906, based on collected user preferences, network pattern and an expected Quality of experience as may be meted out to the user, the training of the base model to generate the trained model is scheduled either at the device or the MEC server acting as a distant remotely connected networking node. In case the model is trained at the MEC server, then the trained model is later updated or instantiated at the device by the MEC server.

In an implementation, irrespective of the location of the training of the base model, following are the example training data (or real network traces) as may be utilized as a part of the reinforcement learning.

TABLE 3

| Network Parameter type | Description |
| --- | --- |
| Start Time Stamp | Starting Time of the Media Content Playback |
| Bytes received | Media Size Received per Chunk |

TABLE 3-continued

| Network Parameter type | Description |
| --- | --- |
| Time Taken | Time Taken to download the chunk of Media |
| Network Type | Type of Network used during Media Playback |
| Operator | Network Operator Used |
| Segment Duration | Duration of a Media Segment (e.g., One MPEGTS Media Fragment) |
| End Time stamp | End Time of the Media Content Playback |
| Chip set | Type/Version of the Device Chipset/ Motherboard configuration used |
| GPS/Tower location from IP | GPS and IP based Longitude and Latitude Information |

In case the training of the base model is scheduled at the UE or device, then the following parameters may be captured as a part of training of the base model at the UE.

TABLE 4

| Type of Parameters | Description |
| --- | --- |
| Network Pattern | Pattern or Trend of Network Condition seen in the Device/Mobile |
| Playback stats | Different Playback stats for analysis |
| Time and type of videos | Time duration till when Video got played and Type or Category of the Video |

Now during the actual content playback as executed by the UE based on the adaptive bit-rate streaming as facilitated by the trained model or second model, following information pertaining to usage of the trained model by the UE may be ascertained:

TABLE 5

| Parameter | Detailed explanation |
| --- | --- |
| App Used | Name of the Application Used for Media Streaming playback |
| Type of Streaming | Type/Application Protocol used for Media Streaming (e.g., HTSP, RTSP etc.) |
| Content Type | Type of Media Content being played (e.g., Video On-Demand, Live) |
| CDN (Content Delivery Network) | Geographically distributed network of proxy servers and data centres for delivering content |
| Device | Device (Mobile or others) being used for Streaming Media |
| Region | Location/Region where the Media Streaming is happening |

The trained model may be further updated with new user usage data and accordingly may undergo even further retraining both on the UE and the MEC server. In an example, the trained model on the UE may be further trained with additional data based on future multimedia-data streaming and encountered network-conditions to cause an ON-device personalized training of the trained model. In a further example, the trained model at the MEC server or any network node/server may be further trained with additional-data based on one or more of: region, location, encountered network conditions to cause a personalized-training of the inference-model at the network-node side.

Figure 10:
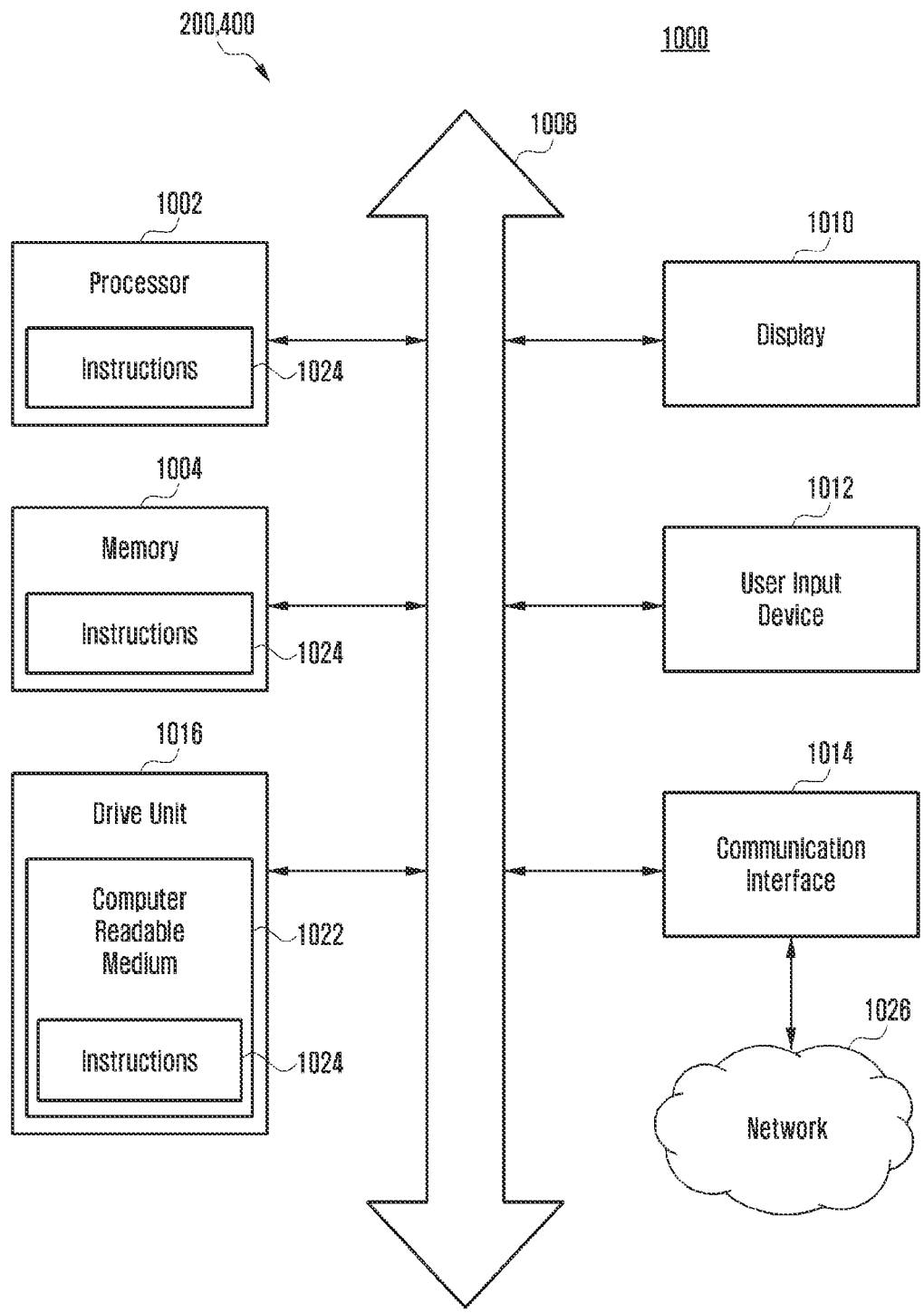
FIG. 10 is a diagram illustrating an example computing-device based implementation of the system depicted in FIG. 2 and FIG. 4, according to various embodiments.

FIG. 10 is a diagram illustrating an example configuration according to various embodiments, and yet another typical hardware configuration of the system 200, 400 in the form of a computer system 1000. The computer system 1000 can include a set of instructions that can be executed to cause the computer system 1000 to perform any one or more of the methods disclosed. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated across various devices, such as, for example, and without limitation, a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1000 is illustrated, the term "system" shall also include any collection of systems or sub-systems that individually or jointly execute a set, or multiple sets, of instructions to perform one or more computer functions.

The computer system 1000 may include a processor 1002 e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (e.g., programmed).

The computer system 1000 may include a memory 1004, such as a memory 1004 that can communicate via a bus 1008. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1004 includes a cache or random access memory for the processor 1002. In various examples, the memory 1004 is separate from the processor 1002, such as a cache memory of a processor, the system memory, or other memory. The memory 1004 may be an external storage device or database for storing data. The memory 1004 is operable to store instructions executable by the processor 1002. The functions, acts or tasks illustrated in the figures or described may be performed by the programmed processor 1002 for executing the instructions stored in the memory 1004. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1000 may or may not further include a display unit 1010, such as a liquid crystal display (LCD), an organic light emitting diode (OLED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1016.

Additionally, the computer system 1000 may include an input device 1012 configured to allow a user to interact with any of the components of system 1000. The computer system 1000 may also include a disk or optical drive unit 1016. The disk drive unit 1016 may include a computer-readable medium 1022 in which one or more sets of instructions 1024, e.g., software, can be embedded. Further, the instructions 1024 may embody one or more of the methods or logic as described. In a particular example, the instructions 1024 may reside completely, or at least partially, within the memory 1004 or within the processor 1002 during execution by the computer system 1000.

The present disclosure contemplates a computer-readable medium that includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020 or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000, or combinations thereof. The connection with the network 1026 may be a physical connection, such as a wired Ethernet connection, or the like, via a communication interface 1014, or may be established wirelessly as discussed later. Likewise, the additional connections with other components of the system 1000 may be physical connections or may be established wirelessly. The network 1026 may alternatively be directly connected to the bus 1008.

The network 1026 may include, for example, and without limitation, wired networks, wireless networks, Ethernet AVB networks, or combinations thereof. The wireless network may be a cellular telephone network, an 802.11, 802.16, 802.20, 802.1Q or WiMax network. Further, the network 1026 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, and/or HTTP) may be used At least based on aforesaid description, the disclosure may render an increased bit rate, higher QoE and substantially mitigates the re-buffering-time. In an example, the present subject matter registers an increased bit rate from about 13% to 15%, an increased QoE ranging from 20% to 32%, while undergoing a significant reduction in the rebuffering time by about 30% to 40%.

Further, the 'Smart Strategy deployment' module for inferencing the selection between UE and MEC server for execution of trained results in about 1% improvement in Battery in normal conditions and ~10% improvement during playback characterized with QoE improvement.

Overall, the disclosure may render a customized model to predict the occurrence of such a network region through particular parameters (e.g., GPS coordinates, time of day etc.) and proactively lowers the video quality in anticipation of low-network region and return to higher quality on leaving this region. This allows the user to enjoy uninterrupted playback even through low network regions and enhances overall video playback experience.

Since this scenario of poor network conditions differs in magnitude (could last anywhere between 10-60+ seconds) and frequency (scenarios that occur often are given a higher priority) from one user to another, the on-Device training in accordance with disclosure may be an optimal technique to allow learning of the user-specific patterns and perform as per the user's personal requirements.

The disclosure addresses the need for collection large data sets across the globe using a combination of supervised learning and reinforcement learning. It not only improves the performance of the model but also reduces the training time. It also focuses on wide variety of input space including but not limited to chunk duration, content encoding parameters, type of network connection etc. Additionally, it learns the user network pattern and preferred QoE which will enable us to provide the user with personalized video streaming experience.

Overall the disclosure may render an optimal usage strategy of on device, server and MEC server based models to optimize battery, latency and prediction using a smart strategy module.

While specific language has been used to describe the disclosure, any limitations arising on account of the same are not intended. As would be apparent to a person in the art, various working modifications may be made to the method in order to implement the disclosure as taught herein.

The drawings and the forgoing description give examples of various embodiments. Those skilled in the art will appreciate that one or more of the described elements may well be combined into a single functional element. Certain elements may be split into multiple functional elements. Elements from one embodiment may be added to another embodiment. For example, orders of processes described herein may be changed and are not limited to the manner described herein.

Moreover, the actions of any flowchart need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of selectively deploying an application for facilitating quality-of-experience (QoE) in streaming multimedia content in a networking environment comprising: a user-equipment (UE) provided with a predictive analysis model and a networking node provided with a predictive analysis model, the method comprising:

capturing parameters pertaining to the UE from:
  a version of the predictive analysis model with respect to the UE;
  a current processor occupancy within the UE; and
  a power level within the UE;
observing one or more network conditions pertaining to an access network being accessed by the UE;
  analyzing a version of the predictive analysis model with respect to the networking node, the captured parameters and the observed network conditions; and
inferencing, based on the analysis, to select between the predictive analysis model of the UE and the predictive analysis model of the networking node to provide a customized streaming of multimedia content at the UE based on the selected predictive analysis model.

2. The method of claim 1, wherein capturing the parameters pertaining to the UE further comprises capturing a current media buffer level of the UE.

3. The method of claim 1, wherein the observing of conditions pertaining to the access network comprises extracting one or more of:
  data-segment download time;
  a roundtrip time between the UE and a server; and
  historical throughput with respect to the access network.

4. The method of claim 1, wherein the inferencing for selecting the predictive analysis model comprises executing a machine-learning (ML) based trained model at least one of the UE or the networking node, the ML based trained model being obtained by customization of an available adaptive bit-rate technique algorithm through execution of a plurality of types of ML mechanisms.

5. The method of claim 1, wherein capturing the parameters pertaining to the UE further comprises capturing a current media buffer level of the UE and observing of conditions pertaining to the access network comprises extracting: data-segment download time, a roundtrip time between the UE and a server, and historical throughput with respect to the access network.

6. A system configured to selectively deploy an application facilitating quality-of-experience (QoE) of streaming multimedia content in a networking environment comprising a user-equipment (UE) including a predictive analysis model and a networking node including a predictive analysis model, the system comprising:
  a capturing module, comprising circuitry, configured to capture parameters pertaining to the UE:
    a version of the predictive analysis model with respect to the UE;
    a current processor occupancy within the UE; and
    a power level within the UE;
  an observation module, comprising circuitry, configured to observe one or more network conditions pertaining to an access network being accessed by the UE;
  an inference module, comprising circuitry, configured to:
    analyze a version of the predictive analysis model with respect to the networking node, the captured parameters and the observed network conditions; and
    inference, based on the analysis, to select between the predictive analysis model of the UE and the predictive analysis model of the networking node to enable a customized streaming of multimedia content at the UE based on the selected predictive analysis model.

7. The system of claim 6, wherein the observation module is configured to observe conditions pertaining to the access network by extracting one or more of:
  data-segment download time;
  a roundtrip time between the UE and a server; and
  historical throughput with respect to the access network,
  wherein the inference module is further configured to select the predictive analysis model by executing a machine-learning (ML) based trained model at least one of the UE or the networking node, the ML based trained model obtained by customization of an available adaptive bit-rate technique algorithm through execution of a plurality of types of ML mechanisms.

8. A system configured to selectively deploy an application facilitating quality-of-experience (QoE) of streaming multimedia content in a networking environment comprising a user-equipment (UE) including a predictive analysis model and a networking node including a predictive analysis model, the system comprising memory and at least one processor coupled to the memory and configured to:
  capture parameters pertaining to the UE from: a version of the predictive analysis model with respect to the UE, a current processor occupancy within the UE, and a power level within the UE;
  observe one or more network conditions pertaining to an access network being accessed by the UE;
  analyze a version of the predictive analysis model with respect to the networking node, the captured parameters and the observed network conditions; and
  inference, based on the analysis, to select between the predictive analysis model of the UE and the predictive analysis model of the networking node to enable a customized streaming of multimedia content at the UE based on the selected predictive analysis model.

9. The system of claim 8, wherein observing the one or more network conditions pertaining to the access network being accessed by the UE includes extracting one or more of:
  data-segment download time;
  a roundtrip time between the UE and a server; and
  historical throughput with respect to the access network,
  wherein the at least one processor is configured to select the predictive analysis model by executing a machine-learning (ML) based trained model at least one of the UE or the networking node, the ML based trained model obtained by customization of an available adaptive bit-rate technique algorithm through execution of a plurality of types of ML mechanisms.

10. The system of claim 8, wherein the selection between the predictive analysis model of the UE and the predictive analysis model of the networking node to enable a customized streaming of multimedia content at the UE is made based on a difference between the version of the version of the predictive analysis model with respect to the networking node and the version of the predictive analysis model with respect to the UE.

* * * * *